June 23, 1970 — L. F. HIMMELMAN — 3,516,639

GAS CONTROL VALVE FOR GAS SHIELDED ELECTRIC WELDING TORCHES

Filed May 17, 1968

INVENTOR.
LOUIS F. HIMMELMAN
BY James L. Carmon
ATTORNEY.

United States Patent Office 3,516,639
Patented June 23, 1970

3,516,639
GAS CONTROL VALVE FOR GAS SHIELDED
ELECTRIC WELDING TORCHES
Louis F. Himmelman, 28 Arrowhead Drive,
Upper Saddle River, N.J. 07458
Filed May 17, 1968, Ser. No. 730,016
Int. Cl. F16k 27/00, 43/00
U.S. Cl. 251—257                              6 Claims

ABSTRACT OF THE DISCLOSURE

A rotary gas control and shut-off valve utilizing a spherical ball check seatable in a frusto-conical valve seat formed along a gas flow path in a valve body member, and a valve stem extending transversely through the body member across the flow path and rotatable with respect thereto about an axis perpendicular to the axis of symmetry of the valve seat. The valve stem has an eccentric cam portion operative, when the valve stem member is rotated, to move the ball check between seated and unseated positions with respect to the valve seat to control gas flow.

---

This invention relates to gas shielded electric welding torches of the type described in my U.S. Pat. No. 3,250,-889 and in my U.S. pat. application Ser. No. 669,115 filed Sept. 20, 1967, titled Gas Cooled and Gas Shielded Electric Welding Torch. The present invention is directed to improvements in the valve mechanism for controlling the flow of inert gas fed under pressure to such torches to provide an inert gaseous atmosphere surrounding the arc flame during welding. In the improved torch described in my above-mentioned patent application, the flow controlled gas is used as a coolant for cooling the torch in addition to being used as an inert gaseous arc tip shroud.

The gas control valve of the present invention is much simpler in construction and operation than gas valves heretofore used in electric arc torches, being comprised simply of a ball check adapted to seat in a frusto-conical valve seat in the gas flow path, and a rotary valve stem having an eccentric or cam portion operative, when turned for the control of gas flow, to move the ball into sealing engagement with its valve seat. This simplicity results not only in a less expensive and more compact valve, but also in more dependable operation. It is, accordingly, the principal object of this invention to provide a novel and improved gas flow control valve especially adapted for use with electric welding torches, which will be inexpensive to manufacture, simple and compact in construction, and dependable and long-wearing in operation.

Other objects, features and advantages will be apparent from the following description when read with reference to the accompanying drawings. In the drawings, wherein like reference numerals denote corresponding parts throughout the several views.

Figure 2:
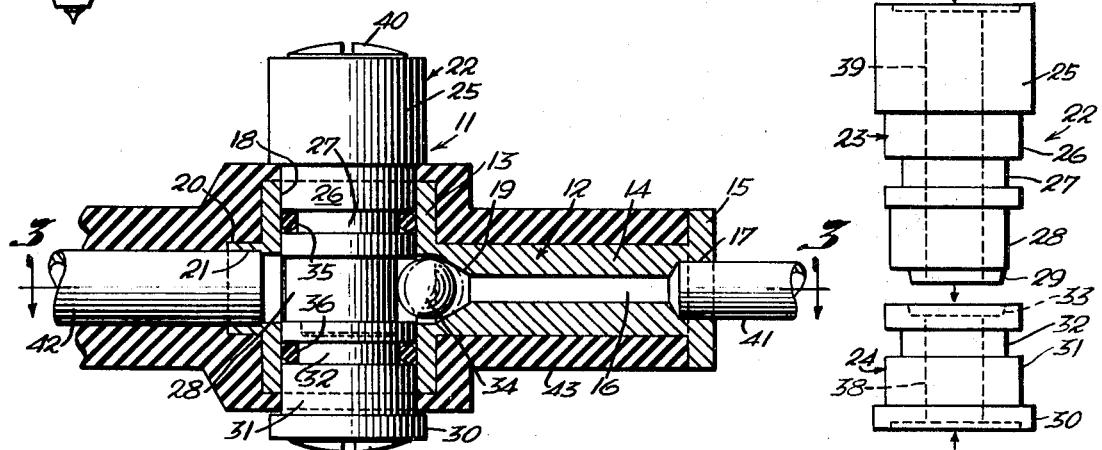
FIG. 2 is a fragmentary view of the torch assembly shown in FIG. 1, illustrating, on an enlarged scale and in vertical cross section, the gas control valve embodying the present invention.
Figure 3:
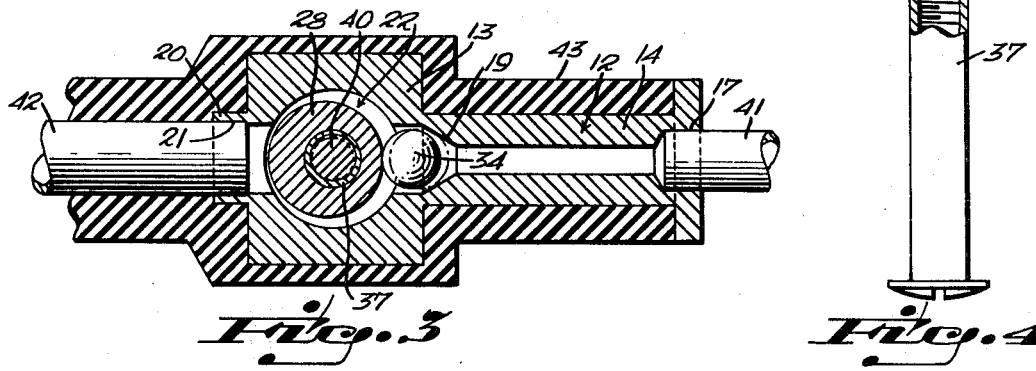
FIG. 3 is a horizontal cross-sectional view taken along the line 3—3 of FIG. 2 in the direction of the arrows and illustrating constructional details of the gas control valve.
Figure 4:
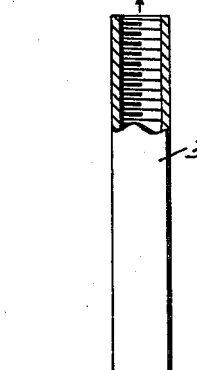
FIG. 4 is an "exploded" view of the valve stem and handle assemblage of the gas control valve, shown separately.

Referring now in detail to the drawings, reference numeral 10 designates, generally, an electric torch of the type described in my above-mentioned patent application, differing principally in being equipped with the improved gas control valve embodying the invention, indicated generally at 11. Referring now to FIGS. 2, 3 and 4, it will be seen that the gas control valve 11 of the present invention comprises a valve housing 12, which is preferably integrally formed of brass. The valve housing 12 comprises a rectangular body portion 13 extending from one side of which is a tubular gas inlet portion 14 the distal end of which is provided with an annular flange portion 15. The central through bore 16 of the tubular inlet portion 14 is counter-bored at its outer end, as indicated at 17, for the purpose hereinafter appearing. The rectangular body portion 13 of the valve housing 12 is formed with a comparatively large, transverse bore 18 which communicates with the central through bore 16 of the tubular inlet portion 14 through a frusto-conical passageway 19 at the inner end of said central bore, said frusto-conical passageway defining a valve seat, as is hereinbelow more particularly described. The rectangular body portion of the valve housing 12 is also formed with an outlet nipple 20 at the side opposite the tubular inlet portion 14 and providing a counter-bored through opening 21 coaxially aligned with the central through bore 16 of said tubular inlet portion.

The gas control valve also comprises a valve stem assembly 22 comprising an upper valve stem section 23 and a lower valve stem section 24. Preferably, the valve stem sections 23 and 24 are machined of "Fluorocarbon Resin" to resist heat. As best illustrated in FIG. 4, the upper valve stem section 23 is integrally formed with a cylindrical handle portion 25 extending into a reduced-diameter portion 26 provided with an annular groove 27 for the seating therein of a sealing O-ring as hereinafter described. The reduced-diameter portion 26 of the upper valve stem section 23 extends into an eccentric cylindrical portion or cam 28 the outer end of which terminates in a short, circular, tapered key portion 29 concentric with the handle portion 25 and reduced-diameter portion 26.

The lower valve stem section 24 is integrally formed with a short, cylindrical outer end portion 30 extending into a comparatively long reduced-diameter portion 31 formed with an annular groove 32 for the reception therein of a second sealing O-ring, as hereinafter described. The outer end of the reduced-diameter portion 31 of the lower valve stem section 24 is formed with a concentric, tapered annular recess 33 adapted to receive, in complementary interfitting engagement upon assembly, the tapered key portion 29 of the upper valve stem section 23.

Referring now to assembly FIGS. 2 and 3, it will be seen that a spherical ball check 34 is disposed within the recess provided by the frusto-conical bore or valve seat 19, and that the upper and lower valve stem sections 23 and 24 are assembled together within the transverse bore of the rectangular body 13 so that the protruding portion of the ball check 34 is received within the eccentric circular groove afforded by the cam portion 28 of said upper valve stem section.

In assembly, the ball check 34 will first be placed in its valve seat 19, after which the upper valve stem section 23, fitted with an O-ring 35, will be inserted in place through the upper end of valve housing transverse bore 18. Next, the lower valve stem section 24, equipped with an O-ring 36, will be inserted through the lower end of the transverse bore 18 in inter-fitting engagement with the upper valve stem section 23, viz, with the tapered key portion 29 of the upper section snugly received within the complementary tapered recess 33 of the lower section. The assemblage is held together by means of an internally-threaded sleeve nut 37 received through coaxial bores 38 and 39 in the lower and upper valve stem sections 24, 23, respectively, retained by a machine screw 40 extending through the upper valve stem section 23.

Figure 1:
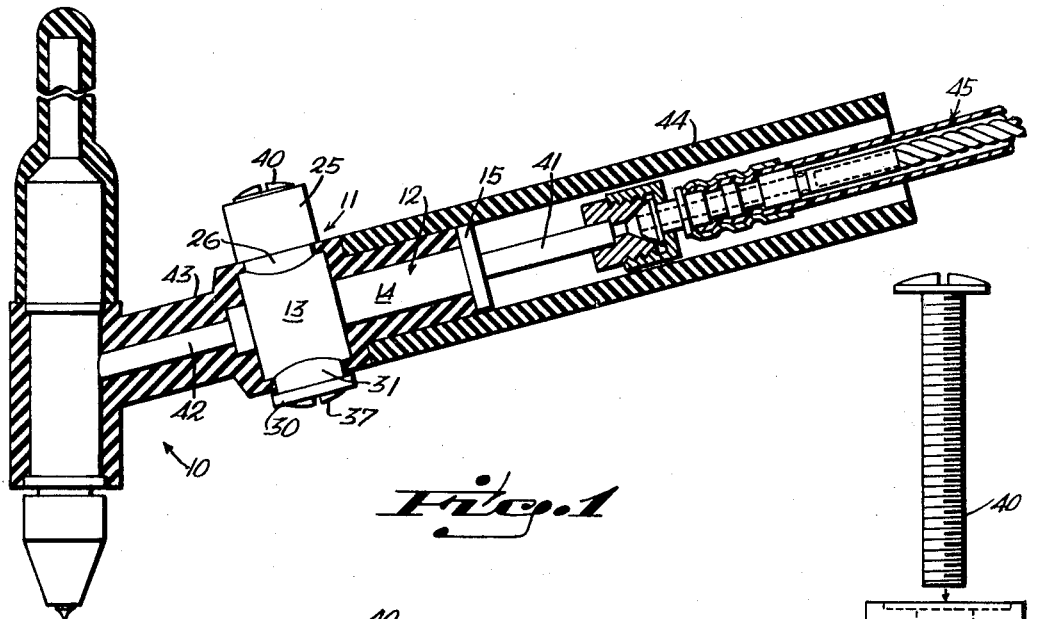
FIG. 1 illustrates, in side elevation and partly in section, an electric welding torch equipped with a gas control valve embodying the invention.

As illustrated in FIGS. 1, 2 and 3, the counter-bored portion 17 of the tubular inlet portion 14 of the gas control valve is adapted to receive an inlet tube 41 forming part of the electric torch for the supply of gas thereto under pressure, and the counter-bore 21 of the outlet nipple 20 is adapted to receive a gas outlet conduit 42 for supplying flow-controlled gas to the torch, said tube and conduit being appropriately brazed or welded in place with respect to the valve housing. Preferably, the valve housing 12 is provided with an insulating jacket 43, which may be comprised of a material having a high dielectric strength as well as good heat insulating qualities, such as a phenolic material or bonded silicone rubber. The insulating jacket portion over the tubular inlet portion 14 has an outer diameter substantially the same as the outer diameter of the end flange 15, so as to receive in pressed-on interfitting engagement a tubular hand grip member 44 that can be removed without difficulty when necessary for disconnecting a gas and electrical current conduit assemblage 45 of the type described in detail in my above-mentioned patent application.

In operation, turning of the cylindrical handle portion 25 of the upper valve stem member 23 will correspondingly rotate its cam portion 28 to move the check ball 34 between seated and unseated positions within its frusto-conical valve seat 19. As illustrated in FIGS. 2 and 3, when the valve stem 22 is in such position that the cam groove has its widest portion facing the ball check 34, said ball check will be moved outward of its valve seat under the pressure of incoming gas, which gas will flow around the cam groove through the outlet nipple 20 and outlet conduit 42. Upon turning the valve stem 22 180 circular degrees in either direction from its position as illustrated in FIGS. 2 and 3, the ball check 34 will be gradually moved from its fully opened position, as illustrated by the full line representation thereof, into its fully seated position as illustrated by the broken line representation thereof.

It is to be noted that the cam action upon the ball check 34 by the valve stem cam portion 28 is so gradual that gas pressure on the inlet side will not cause reversal or self-opening of the valve. The gas sealing O-rings 35 and 36, moreover, which are preferably of a tough, heat-resistant material such as silicone rubber, also afford sufficient friction to prevent self-turning of the valve stem assembly under normal operating conditions. It is further to be noted that the inter-fitting of the conical key portion 29 of the upper valve stem section 23 within the tapered recess 33 of the lower valve stem section 24 will be tight enough to prevent the leakage of gas as this juncture.

While I have illustrated and described herein only one form in which the invention can conveniently be embodied in practice, it is to be understood that this form is presented by way of example only and not in a limiting sense. The invention, in brief, comprises all the embodiments and modifications coming within the scope and spirit of the following claims.

What I claim as new and desire to secure by Letters Patent is:

1. A rotary gas flow control valve for electric arc torches and the like comprising, a valve body member having substantially coaxial gas inlet and gas outlet passageways, a bore in said valve body member transverse with respect to and communicating at opposite interior sides thereof with said gas inlet and said gas outlet passageways, a frusto-conical valve recess formed at the communicating juncture between said gas inlet passageway and said valve seat recess, and a valve stem member rotatably received within said transverse bore, said valve stem member having cam means in register with said ball check operative, upon rotation of said valve stem member, to move said ball check between unseated and seated positions with respect to said valve seat recess, said cam means comprising a cylindrical cam portion eccentric with respect to said transverse bore and defining a cam groove within which said ball check is partially received, said valve stem member comprising a pair of longitudinally-divided upper and lower valve stem sections, said upper section comprising said cylindrical cam portion, and means for bolting said upper and lower valve stem sections together within said transverse bore.

2. A rotary gas flow control valve as defined in claim 1 wherein said bolting means comprises a sleeve nut extending through axial bores in said upper and lower valve stem sections and a machine screw threaded in said sleeve nut.

3. A rotary gas flow control valve as defined in claim 2 including means for securing said valve stem sections in end-to-end interfitting engagement.

4. A rotary gas flow control valve as defined in claim 3 wherein said securing means comprises a short, tapered cylindrical key portion formed on one of said valve stem sections receivable in a complementary tapered circular recess in the other of said valve stem sections.

5. A rotary gas flow control valve as defined in claim 3 including means for individually sealing said upper and lower valve stem sections with respect to said transverse bore.

6. A rotary gas flow control valve as defined in claim 5 wherein said sealing means comprises resilient O-rings seated within annular grooves provided in said upper and lower valve stem sections.

References Cited

UNITED STATES PATENTS

| 2,408,006 | 9/1946 | Smith | 251—257 X |
| 2,665,878 | 1/1954 | Grunt | 251—257 |
| 2,869,582 | 1/1959 | Skipwith | 251—257 X |
| 3,134,569 | 5/1964 | Sidenbender et al. | 251—259 X |

WILLIAM F. O'DEA, Primary Examiner

D. R. MATTHEWS, Assistant Examiner

U.S. Cl. X.R.

137—315; 251—357, 367